US009011155B2

(12) United States Patent
Skelton et al.

(10) Patent No.: US 9,011,155 B2
(45) Date of Patent: Apr. 21, 2015

(54) METHOD AND SYSTEM FOR BEHAVIOR MODIFICATION AND SALES PROMOTION

(71) Applicants: Joan M Skelton, Atlanta, GA (US); Benjamin J Kwitek, Canon City, CO (US)

(72) Inventors: Joan M Skelton, Atlanta, GA (US); Benjamin J Kwitek, Canon City, CO (US)

(*) Notice: Subject to any disclaimer, the term of this patent is extended or adjusted under 35 U.S.C. 154(b) by 0 days.

(21) Appl. No.: 13/778,848

(22) Filed: Feb. 27, 2013

(65) Prior Publication Data
US 2013/0224705 A1 Aug. 29, 2013

Related U.S. Application Data

(60) Provisional application No. 61/604,805, filed on Feb. 29, 2012.

(51) Int. Cl.
*G09B 19/00* (2006.01)
(52) U.S. Cl.
CPC ..................................... *G09B 19/00* (2013.01)
(58) Field of Classification Search
CPC ...... G09B 19/00; G09B 5/14; G06Q 30/0209; G06Q 30/0201
USPC ............................... 434/236, 238, 237, 307 R
See application file for complete search history.

(56) References Cited

U.S. PATENT DOCUMENTS

| | | | |
|---|---|---|---|
| 6,267,672 B1 | 7/2001 | Vance | |
| 2004/0180708 A1 | 9/2004 | Southard et al. | |
| 2005/0287502 A1 | 12/2005 | Southard et al. | |
| 2006/0154560 A1* | 7/2006 | Ahmed | 446/297 |
| 2006/0204938 A1 | 9/2006 | Field | |
| 2009/0167767 A1 | 7/2009 | Shoval | |
| 2009/0228581 A1 | 9/2009 | Cairns | |
| 2009/0276288 A1 | 11/2009 | Hlavac et al. | |
| 2010/0030592 A1* | 2/2010 | Evans et al. | 705/5 |
| 2011/0148916 A1 | 6/2011 | Blattner | |
| 2011/0167342 A1 | 7/2011 | de la Pena et al. | |
| 2011/0219084 A1 | 9/2011 | Borra et al. | |
| 2011/0237227 A1 | 9/2011 | Kemery et al. | |
| 2011/0270698 A1 | 11/2011 | Gunther | |
| 2012/0165618 A1 | 6/2012 | Algoo et al. | |
| 2012/0308970 A1 | 12/2012 | Gillespie et al. | |

* cited by examiner

*Primary Examiner* — Bruk Gebremichael
(74) *Attorney, Agent, or Firm* — Welsh Flaxman & Gitler LLC

(57) ABSTRACT

A system for behavior modification and sales promotion includes a child computer device having a computer application stored thereon in a non-transitory computer readable memory. The computer application of the child computer device includes a graphical user interface allowing for a child to interact with a fictitious character. A parent computer device is provided having a computer application stored thereon in a non-transitory computer readable memory, the computer application of the parent computer device including a graphical user interface allowing a parent to control the fictitious character with which the child interacts on the child computer device. The system also includes a system server. The parent computer device, the child computer device and system server are connected by a global communication network.

18 Claims, 10 Drawing Sheets

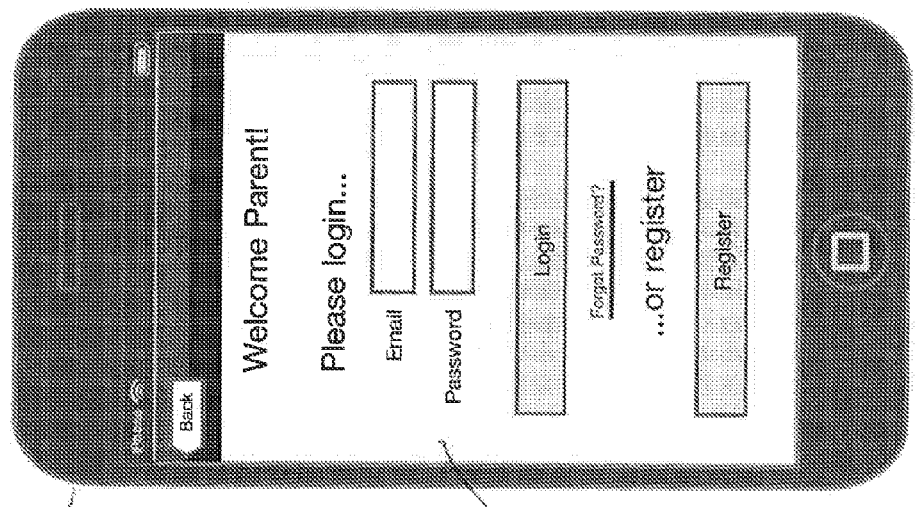
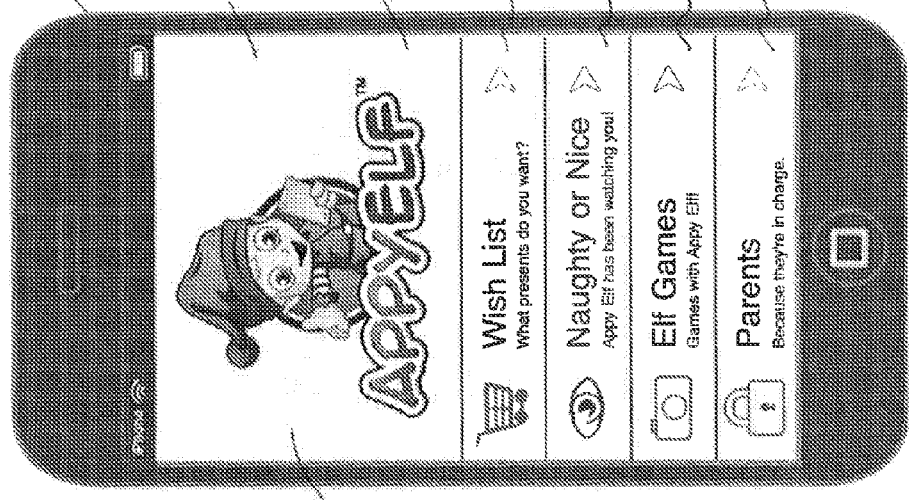

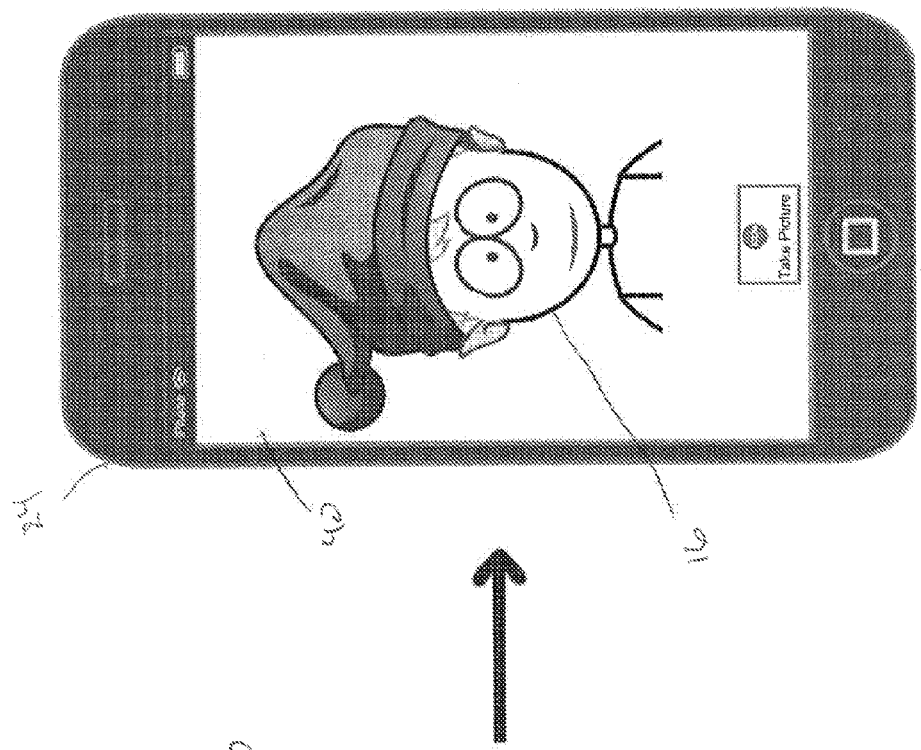
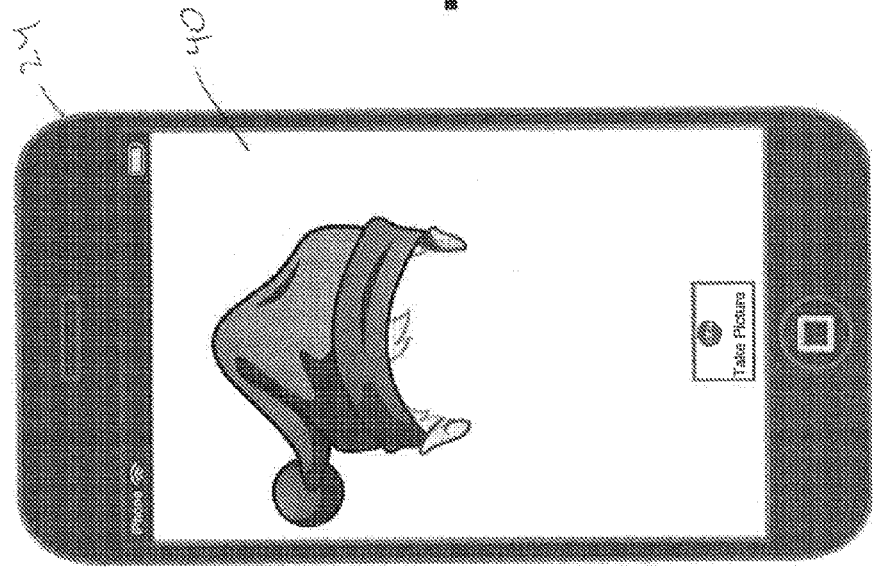

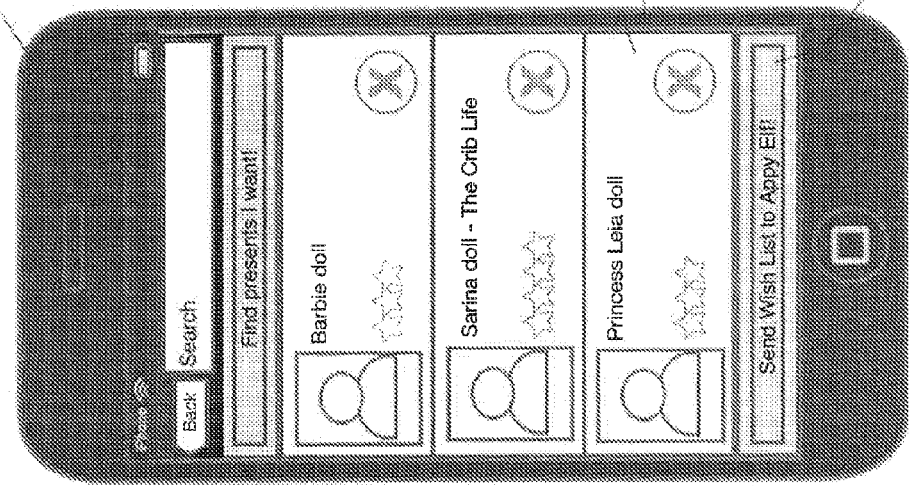
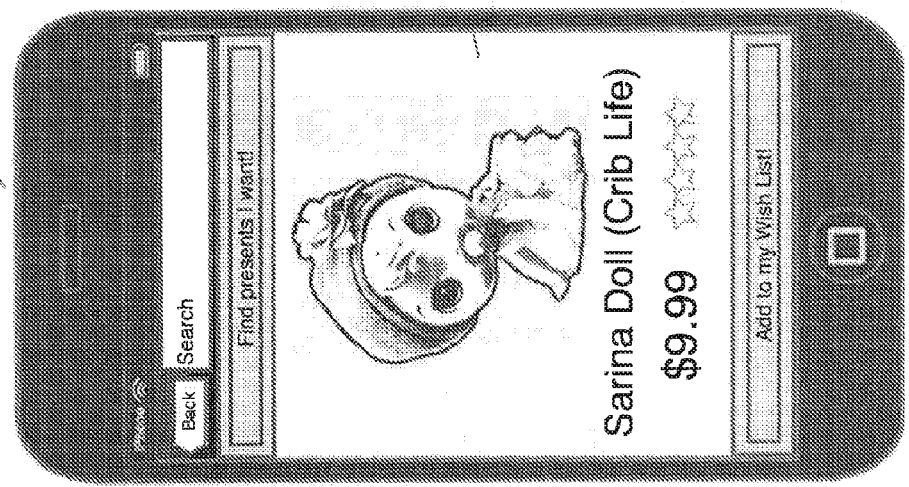
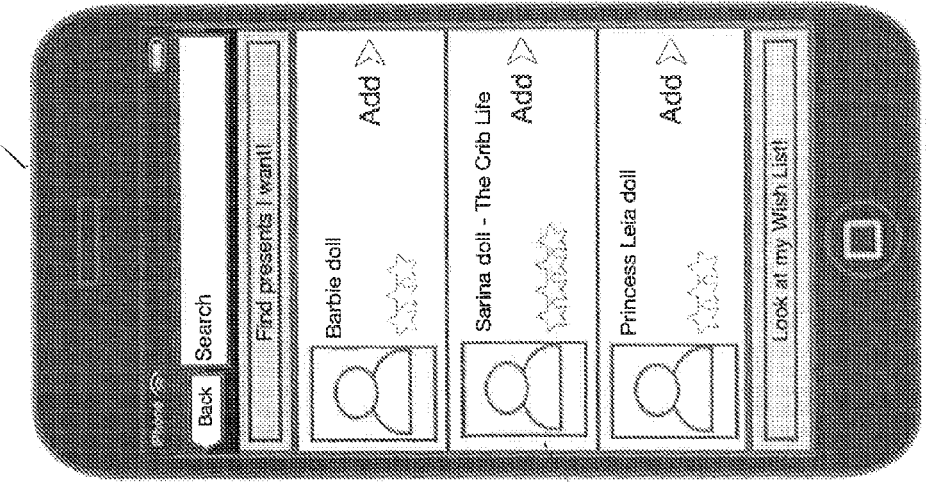

METHOD AND SYSTEM FOR BEHAVIOR MODIFICATION AND SALES PROMOTION

CROSS REFERENCE TO RELATED APPLICATION

This application claims the benefit of U.S. Provisional Patent Application Ser. No. 61/604,805, entitled "METHOD AND SYSTEM FOR BEHAVIOR MODIFICATION AND SALES PROMOTION," filed Feb. 29, 2012.

BACKGROUND OF THE INVENTION

1. Field of the Invention

This invention relates to a computer program or app that allows a parent to monitor and modify his or her child's behavior while allowing the child to participate in a fun interactive experience. It should be noted that the term "parent" is used throughout this application and may mean biological parent, adopted parents, older family members, trusted adults or legal guardians. In particular, the present invention utilizes an app where a fictitious character interacts with the child. The fictitious character is controlled by the parent and empowers the parent to encourage good behavior and remediate bad behavior through communication back to the child from the fictitious character along with a scoring system on the app. Furthermore, the parent and child may select rewards for good behavior. These rewards might include toys, games and other commercial goods. The data gathered from the use of the app could then be managed and coordinated with various third party retailers and outside companies who make or sell the desired goods.

2. Description of the Related Art

Ever since the first parents began to raise their first child, there has been a need for the parents to modify the behavior of the children. Unfortunately, human history has documented the difficulties of successful parenting. One of the ways that parents have controlled behavior is through the use of rewards and punishments. One of the favorite rewards is the ability to buy the child a toy or present. If the parent utilizes a fictitious third-party—such as Santa Claus, the Easter Bunny, Tooth Fairy or an elf—the results are even better.

Nevertheless, in the 21st Century a lot of things have changed—not the least of which is how children interact with their parents in this digital age. There are at least three major problems that parents, consumer products companies and retailers face in the current marketplace.

One, there is the problem of parent and child alienation. In this modern age, children are exposed to more outside influences through TV, personal computers, portable electronics devices and social networks than ever before, leading them to mature more quickly and pull away from their parents at an earlier age. As a result they often respect their parents less, which can lead to bad behavior. This bad behavior sometimes causes the parent to attempt more discipline, which may further alienate the child. Modern technology has only exacerbated the challenge for parents, resulting in personal communication between parent and child not being as comprehensive as it once was. Where a child was once isolated at home or at the dinner table, today this child can be texting his or her friends in the middle of dinner. The child can be playing games 24 hours a day without having to invite over friends or go to the television set in the family room. Today, chances are the child is sharing ideas regarding what toys, games or apps are the most "cool" with friends over Facebook or doing their own shopping for toys or apps on a smartphone, rather than sharing that information with their parents.

Two, traditional and fictional third-party characters used to encourage a child's good behavior have not kept pace with technology. Parents have commonly used third-party characters to help keep their children in line. If a Mom tells her son to clean his room, it may not have much impact. If that same Mom tells her son that Santa Claus is watching and if he cleans his room he may get the new toys he wants, the behavioral difference is notable. The use of a third party is especially effective when the third party is somewhat magical or supernatural in his or her powers. The problem today is that third party characters have not been integrated into the technological devices that today's children are increasingly familiar with.

Three, the same problem regarding pre-adolescent wishes and tastes also affects manufacturers and retailers. How can a company know what toy or product will be the "hot" item in a particular year? Where can companies access this information in near real-time? Since their target consumer is under-aged, they cannot, effectively survey them or interact much without parental involvement, which is expensive and time-consuming. Manufacturers and retailers often do not have enough data to make the best decisions. Furthermore, retailers cannot effectively capitalize on trends because they are late to catch on. This tardiness also gives an advantage to certain retailers who are more adept at managing their supply chain or at quickly interacting with their customers.

There have been various attempts to improve parent and child interaction. There have also been programs to encourage parents and children to communicate with retailers. These efforts have been met with limited success for various reasons. For example, much of the information on improving child behavior uses old media where the parent was forced to use a movie or book to help his or her child or provide parental advice. In addition, the prior fictitious third-party character solutions have relied on traditional methods that provide limited interaction between parent and child and no communication back to retailers. Taking a child to the mall to see Santa or having an elf toy on the shelf or nightstand seems outdated when one could have, a virtual Santa or elf on their iPhone or iPad. Further, these older technologies did not allow for any data gathering and there was no method for a beneficial consumer and retailer interaction.

With the foregoing in mind, the present method and system attempts to address these shortcomings by providing an app that 1) allows a parent to monitor and modify his or her child's behavior while allowing the child to participate in a fun interactive experience and 2) provides an invaluable, near real-time communication link back to retailers regarding a child's current must have wish list of toys and gifts.

SUMMARY OF THE INVENTION

It is, therefore, an object of the present invention to provide, a system for behavior modification and sales promotion. The system includes a child computer device having a computer application stored thereon in a non-transitory computer readable memory. The computer application of the child computer device includes a graphical user interface allowing for a child to interact with a fictitious character. A parent computer device is provided having a computer application stored thereon in a non-transitory computer readable memory, the computer application of the parent computer device including a graphical user interface allowing a parent to control the fictitious character with which the child interacts on the child computer device. The system also includes a system server.

The parent computer device, the child computer device and system server are connected by a global communication network.

It is also an object of the present invention to provide a system wherein the parent computer device includes a parent version of the computer application.

It is another object of the present invention to provide a system wherein the parent version of the computer application provides a graphical user interface allowing the parent to see ever/thing the child has done.

It is a further object of the present invention to provide a system wherein the child computer device includes a child version of the computer application.

It is also an object of the present invention to provide a system wherein the fictitious character interfaces with the child based upon specific text and actions the parent enters into the computer application on the parent computer.

It is another object of the present invention to provide a system wherein the fictitious character interfaces based upon "autonomous" behavior of the fictitious character.

It is a further object of the present invention to provide a system wherein the graphical user interface provides the child with an indication of a score.

It is also an object of the present invention to provide a system wherein the computer application of the parent computer device, and the computer application of the child computer device are the same and the computer application includes a parent interface and a child interface.

It is another object of the present invention to provide a system wherein the fictitious character interfaces with the child based upon specific text and actions the parent would enter into the computer application on the parent computer.

It is a further object of the present invention to provide a system wherein the fictitious character interfaces based upon "autonomous" behavior of the fictitious character.

It is also an object of the present invention to provide a system wherein the graphical user interface provides the child with an indication of a score.

It is another object of the present invention to provide a system wherein the parent version of the computer application provides a graphical user interface allowing the parent to see everything the child has done.

It is a further object of the present invention to provide a system wherein the data from the parent or child computer application is linked to consumer goods companies or retailers.

It is also an object of the present invention to provide a system wherein the parent computer device is a desktop computer, laptop computer, smartphone, tablet or portable music/video player and the child computer device is a desktop computer, laptop computer, smartphone, tablet or portable music/video player.

It is another object of the present invention to provide a system a method for behavior modification and sales promotion. The method includes installing a computer application on a non-transitory computer readable memory of a child computer device, the computer application of the child computer device including a graphical user interface allowing for a child to interact with a fictitious character. The method also includes installing a computer application on a non-transitory computer readable memory of a parent computer device, the computer application of the child computer device including a graphical user interface allowing a parent to control the fictitious character with winch the child interacts on the child computer device. The parent computer device and the child computer device are connected to a system server via a global communication network.

It is also an object of the present invention to provide a method wherein the parent computer device is a desktop computer, laptop computer, smartphone, tablet or portable music/video player and the child computer device is a desktop computer, laptop computer, smartphone, tablet or portable music/video player.

It is another object of the present invention to provide a method wherein the step of installing includes downloading the computer application of the parent computing device from the system server.

It is a further object of the present invention to provide a method wherein the step of installing includes downloading the computer application of the child computing device from the system server.

It is also an object of the present invention to provide a method wherein the fictitious character generates autonomous responses based on selected parameters.

It is another object of the present invention to provide a method wherein the computer application of the parent computing device gives the parent the option to encourage good behavior with rewards and discourage bad behavior with reminders, the removal of rewards or punishments.

It is a further object of the present invention to provide a method including the step of allowing the child to select rewards based upon good behavior.

It is also an object of the present invention to provide a method including the step of the system server sending the data to consumer goods companies or retailers.

It is another object of the present invention to provide a method whereby consumer goods companies or retailers receive data from the computer application for compilation and analysis.

It is a further object of the present invention to provide a method wherein the consumer goods companies or retailers offer promotions to the parent or child for the desired goods or other related products or services.

Other objects and advantages of the present invention will become apparent from the following detailed description when viewed in conjunction with the accompanying drawings, which set forth certain embodiments of the invention.

BRIEF DESCRIPTION OF THE DRAWINGS

FIGS. 3-19 show various graphical user interfaces employed in accordance with, the present invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Figure 1:
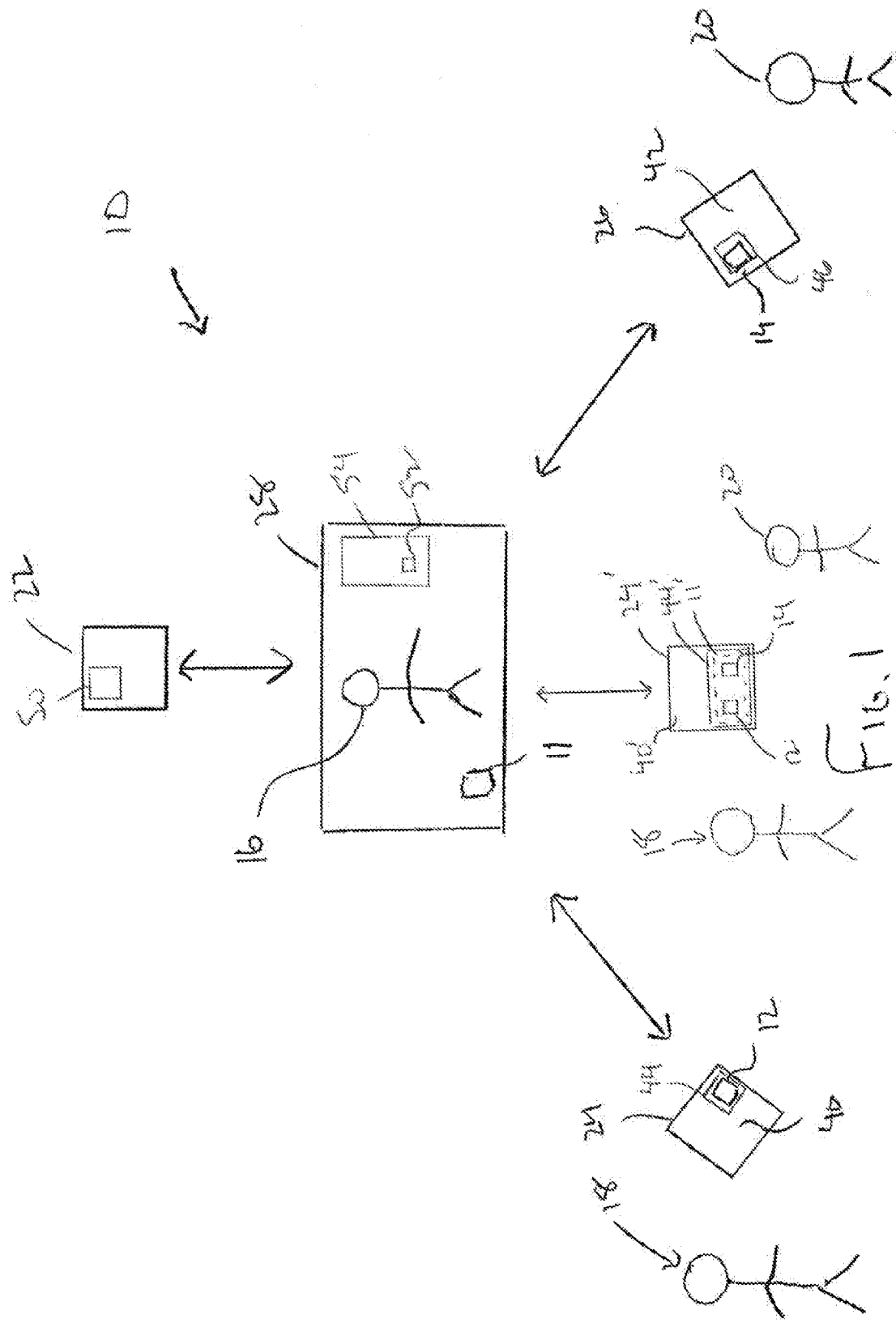
FIG. 1 is a schematic of the present invention
Figure 2:
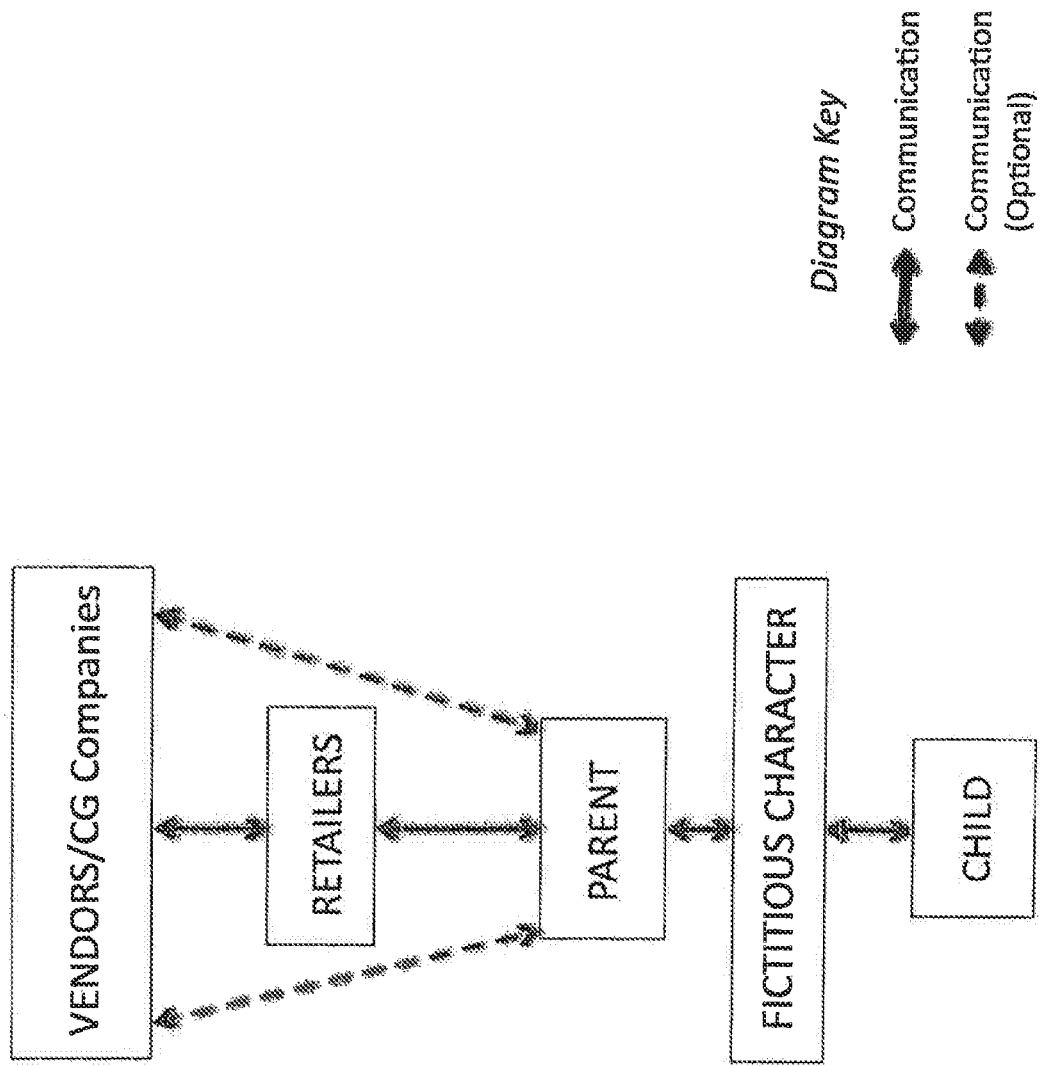
FIG. 2 is a flow chart showing interaction of the various elements of the present system.

In accordance with the present invention, and with reference to FIGS. 1 and 2, a method and system 10 for behavior modification and sales promotion is disclosed. The system 10 employs a computer program or app 11 that allows a parent 18 to monitor and modify his or her child's behavior while allowing the child 20 to participate in a fun interactive experience. As is appreciated, the term "app" as used herein is meant to refer to a software application maintained on a non-transitory memory of a computer device. The term "app" is shorthand for "application" and has been used within the computer industry to refer to a variety of software products that may be employed by computers, smartphones, tablets and other portable electronic or communication devices to enhance the functionality thereof.

The present method and system 10 provides a solution to a current problem of parenting. It allows parents the chance to interact with their children in a fun and dynamic way. This interaction improves behavior and ensures happy children who get what they want when the parents believe they deserve it. It also collects data and provides real advantages to retailers and other partners.

In accordance with the present invention, an app 11 is employed that allows for a child 20 to interact with a fictitious character 16 (in the form of an animated humanoid character, an animal, a toy, or other object with which a child might enjoy interacting). The fictitious character 16 is controlled by the parent 18 and empowers the parent 18 to encourage good behavior and remediate bad behavior through a scoring system on the app 11. Furthermore, and as will be appreciated based upon the following disclosure, the parent 18 and child 20 may select rewards for good behavior. These rewards could include toys, allowance money, treats, extra playtime with their favorite toy or other rewards. The data gathered from the use of the app 11 could then be managed and coordinated with various third party consumer goods companies and retailers (i.e., outside companies) 22.

The present method and system 10 for behavior modification and sales promotion relies upon an app 11 that is to be downloaded to both a parent computer device 24 as a parent version of the app 12 and a child computer device 26 as a child version of the app 14. It is possible that only one computer device could be shared by the parent and child. In accordance with such an embodiment, software would allow for unique users with log-in procedures. It is also appreciated, the app 11 itself might be the same for both the parent computer device and the child computer device, with the distinction being that functionalities associated with the app 11 are locked to define the parent version of the app 12 and the child version of the app 14.

It is appreciated the computer industry is quickly developing and the actual computer device used in the implementation of the present method and system may change over time. However, and by way of example, it is contemplated the present method and system may be implemented, but is not limited to, desktop computers, laptop computers, smartphones, tablets, or portable music/video player. It is also appreciated, the app could also be resident within a toy that exists solely for this one purpose; i.e. a behavior modification doll.

The app 11 facilitating the operation of the present method and system 10 is first downloaded to a parent's computer device 24 or a child's computer device 26 (if the child has their own device; if not, the app 11 (including both the parent version of the app 12 and the child version of the app 14) is downloaded to a computer device 24' which both the child 20 and parent 18 use), after an initial user account, is established on the system server 28. It is appreciated the system server 28 is conventional web server providing for the processing of data, storage of data, and the input/out of information to users of the present system 10. The app 11 is downloaded to the parent computer device 24 from the system server 28 via a global communication network, for example, the Internet. As mentioned above, it is appreciated both the child version of the app and the parent version of the app could be downloaded to the same device where a family only has one computer device available for use by the parent and child. In such a situation, the parent would be led to the parent version of the app by an appropriately labeled icon and the child would be led to the child version of the app by a similarly appropriately labeled icon. It is also appreciated that there may only be one app for parent and child. In other words, the app would be one master program with two interfaces for parent and child. In either embodiment, parent and child interfaces would be appropriately labeled.

The child version of the app 14 allows the child 20 to focus upon the fictitious third-party character 16. The child 20 sees this fictitious character 16 and interacts via simulated text message or other pre-programmed interactions, possibly including video, sound and/or games. It is appreciated that quite possibly the child is not really texting a person but rather the artificial intelligence of the software. For example, the child version of the app 14 could be programmed so that the fictitious character 16 asks them how they behaved today and the child 20 responds but it is ail within the child version of the app 14, thus not necessarily requiring input from the parent 18. Still, it is anticipated that, this data may be seen by the parent through his or her use of the app as will be further described. The child 20 would also see his or her "naughty or nice" score for the day, week, month or year. The child 20 could also make lists of things he or she has done to earn a higher score. Finally, the child 20 could list or select the rewards that he or she would like. This would include toys and presents that he or she would prefer. It is also appreciated that it may include rewards that are not monetary such as a night off from chores, a trip to the park after school, etc. All of these iterations would occur with appropriate graphical user interface screens displayed on the smartphone, tablet, or other electronic device.

The parent or local administrator version of the app 12 allows the parent 18 to see everything the child 20 has done. The parent 18 speaks through the fictitious third-party character 16 in offering positive or negative feedback to the child 20. This feedback could be done at the end of the day, with the parent 18 and child 20 sitting down together, maybe right before they go to sleep which is usually when parents 18 sum up what their child 20 has done well that day (such as having completed all their chores, homework, cleaned up their room, brushed their teeth, etc.). However, it could be done at any time the parent wanted, if every time the child 20 did something positive or negative, the fictitious character 16 could respond. It is only limited to how much effort the parent 18 wants to put into it. The parent version of the app 12 might also allow for a time-delay of messages or activities within the app. For example, the parent 18 could enter a series of messages before boarding a plane and have them delivered to the child 20 even while the parent's device is turned off enroute. The parent 18 may also be provided a menu of pre-made messages that he or she could select that could be sent to the child 20.

The fictitious character 16 on the app 11 has a two-level interface with the child 20. The first level would be the specific text and actions that the parent 18 would enter into his or her app 12 in real-time. These would be day or week specific and would highlight the "magical" knowledge of the fictitious character 16. The second level would be somewhat "autonomous" behavior on the part of the fictitious character 16. When setting up the child version of the app 14 or changing preferences, the parent 18 could give the fictitious character 16 some flexibility in giving the child 20 automatic and perhaps real-time responses. These would be determined through the help of software analytical processes. These might include algorithms and formulas to make the fictitious character 16 appear intelligent. Again these responses may be "intelligent" in that the software program, that is, the app 11 would learn what the parent 18 entered over time. This would occur through the automated analysis of keystrokes and input of the parent 18 by the software. In this way, the parent 18 would need to spend less time with the parent version of the app 12. For example, if the child 20 sent a message such as "I love you Santa", the Santa on his or her computer device 26 would be empowered to reply, "Santa loves to hear that." Again, these autonomous responses would be seen by the parent 18 and governed by his or her selection of preferences. In this way, however, the parent 18 gets the benefit of interacting with their child 20 without actually interacting.

In both the child version 14 and the parent version 12 (or the combined version 11'), a fun and entertaining graphical user interface 40, 42, 40' is provided. The graphical user interface 42 of the child version 14 provides for a more game-like interface designed to keep the attention of the child 20. There are a lot of graphics, animation and even video to make the child version of the app 14 appealing. These graphical elements, including animations and videos exist on the non-transitory memory 44, 46, 44' of the computer device 24, 26, 24' of the parent 18 or child 20. Alternatively, this content may could be stored in the "cloud" or on a remote server and only retrieved when requested by the parent or child. The intensive-graphics files could then be stored on the servers of the consumer goods company, retailer or app provider. Additionally, both the parent version of the app 12 and the child version of the app 14 allow for the tracking of the child's behavior and show progress in performance over any period of time. It is also contemplated that the app could link to other users, such as neighbor kids or parents or children from school via online, communication methods known to those in the art. Through the use of social networks, the child could connect to his or her friends. In this way, content could be shared, ranked and organized. This process would provide additional data to the consumer goods company and/or retailer 22. It is estimated that the consumer goods company and/or retailer 22 might even provide ads or promotions to the parent 18 and or child 20 (see FIG. 19). Again this feature would be managed and overseen by the parent 18 and is purely discretionary.

Through interaction with the system server 28, the parent version of the app 12 is linked to potential partners assuming the consent or the parent. These partners might include retailers and even consumer goods companies 22. Once the parent 18 develops a list of potential rewards, this data can be electronically transmitted to consumer goods companies and retailers 22 (and stored in a database 50 for use as desired) if the parent so chooses. The details of the communications would likely be a function of what retailers or consumer products companies might offer the parents in exchange for this communication link. If utilized, the consumer goods companies and retailers 22 would then have valuable data on what toys or presents kids are putting on their wish lists. Consumer goods companies and retailers 22 could leverage this data in their relationships with their vendors to ensure timely delivery and effective pricing. It is anticipated that the consumer goods company or retailer would develop software to manage the incoming flow of data. Through the use of statistical modeling, they could divine patterns and trends, which would be helpful to product planning, purchasing, marketing and sales. For example, given some basic information supplied by the parent when using the system, the consumer goods company and/or retailer would know the zip code and age of the child selecting his or her "wish list" of gifts. Using databases of demographic information, consumer goods companies and/or retailers could extrapolate what small sets of data mean to their business and overall sales. Case in point: perhaps a child in a largely Hispanic geographical region would be more helpful in forecasting sales in Texas as opposed to Alaska.

The parent version of the app 12 allows for retailer 22 interaction with the parent 18. As such, the retailer 22 may forward customized coupons or promotions based on the specific data they have received from the parent version of the app 12. These offers might include bar codes or QR codes so that the parent could simply scan his or her electronic, device at checkout to receive the promotion. Emails and even regular printed materials could be produced depending on the plans of the consumer goods company, retailer and parent. As some people might, consider such interaction undesirable, the parent version of the app 12 is provided with mechanisms for the parent 18 to opt out of such direct interactions with the retailer 22. However, the method and system 10 of the present invention are designed such that direct communications will lead to a win-win-win situation, and it is anticipated parents 18 will desire, such direct interactions with the consumer goods companies and retailers 22.

The method and system of the present invention is also designed for possible integration with toys and other items that children interact with on a daily basis. Clearly a computing device of some sort would be required, but the present method and system may be implemented as part of a toy, such as a stuffed animal or doll. It also anticipated that this computing device, enabled with this app, could be connected to clothing, footwear, backpacks, cases, sporting equipment and toys of any kind. In this way, the virtual character on the screen would be augmented by the physical product. The incorporation with a physical product, such as a toy, could be achieved with wires and ports. Alternatively, wireless technologies such as Bluetooth could be employed, to send and retrieve, data from the server of the consumer goods company or retailers though a wireless network. The direct incorporation of advanced electronics such as flexible displays and projected images (such as holograms) is also possible for the future use of this app technology. It is also anticipated that such toys would provide for increased website traffic and added value for consumer goods companies and/or retailers. For example, a stuffed animal toy with a QR code or flexible display might prompt, the parent or child to visit the website of the toy company. This interaction benefits the toy company as it now has a more engaged customer who is likely to spread his or her enthusiasm for the products and company in addition to likely buying more merchandise. It allows for a more proactive relationship between the consumer goods company and/or retailer and the end customer.

Although it is appreciated various embodiments are possible within the proposed invention, the following sets forth by way of example an actual implementation of the present method and system 10.

1. The parent 18 establishes a user account with the system server 28 or begins by downloading the app 11 (step 2 below).
2. The parent then downloads the app 11 on the parent computer device 24 (in this case a smartphone). Referring to FIG. 3, with the app 11 downloaded on the parent computer device 24, and functioning as a parent version of the app 12, a graphical user interface 40 with a Home Page 100 is presented offering the user the opportunity to look at the Wish List 102, check on whether the user (or others) have been Naughty or Nice 104, play Elf Games 106, or enter the Parent controlled functionalities 108.

Figure 6:
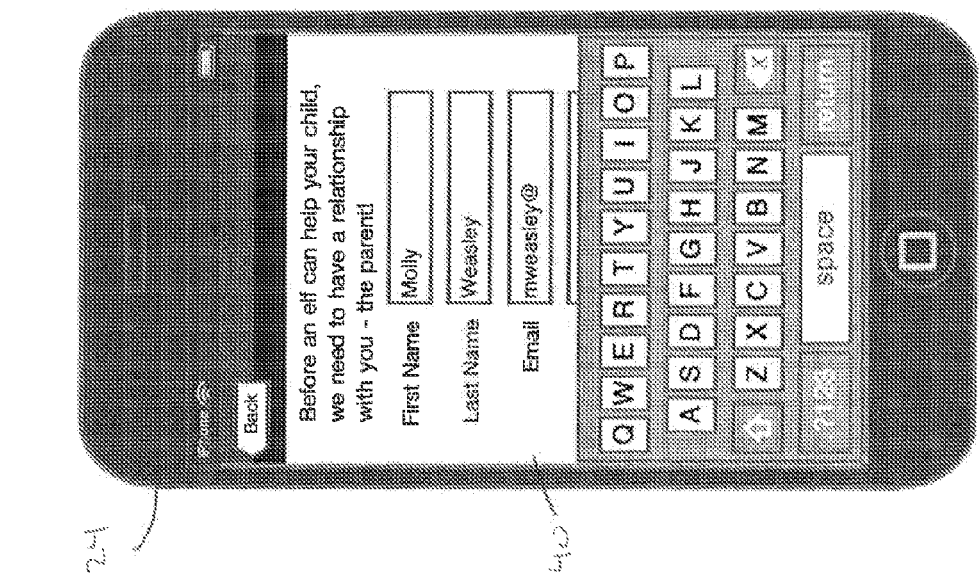
Figure 5:
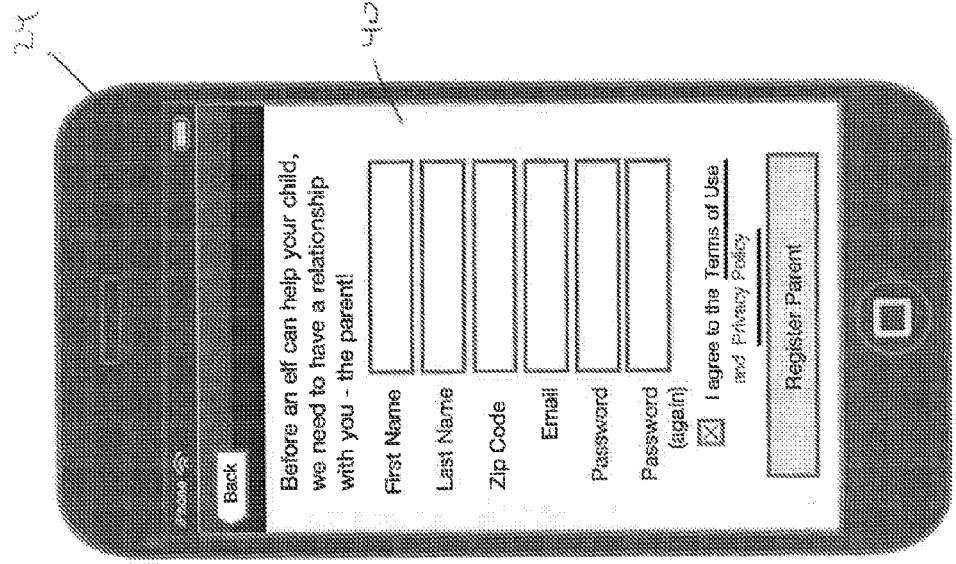
Figure 6:
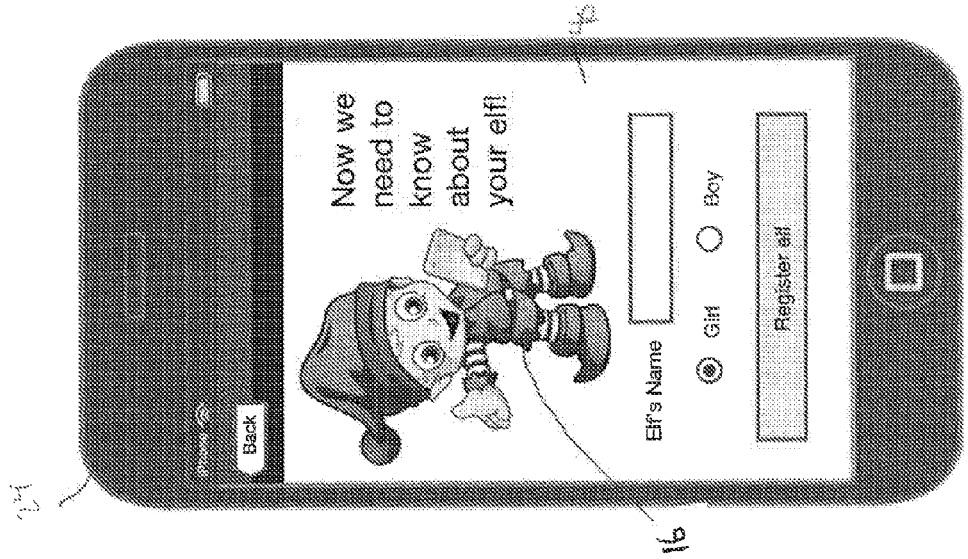
Figure 7:
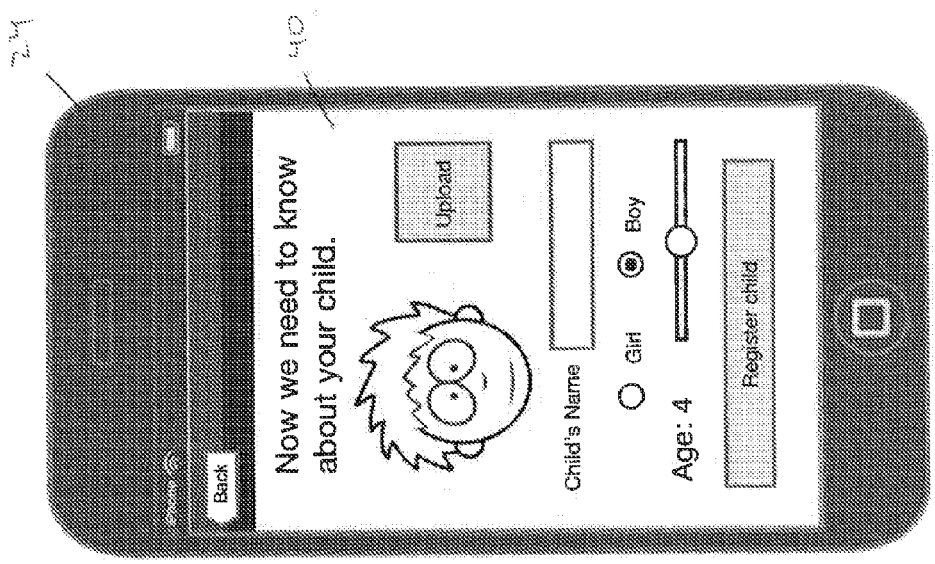
Figure 17:
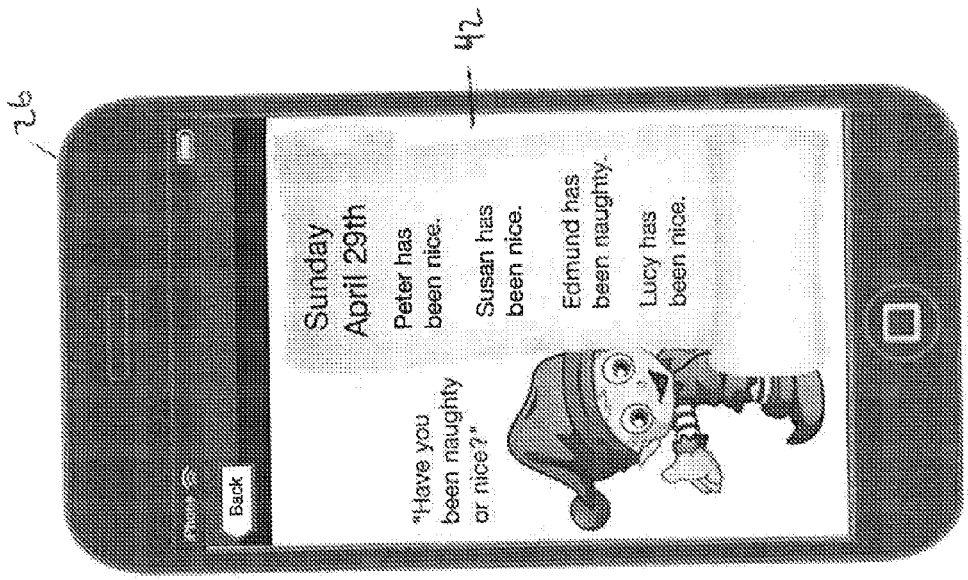
Figure 16:
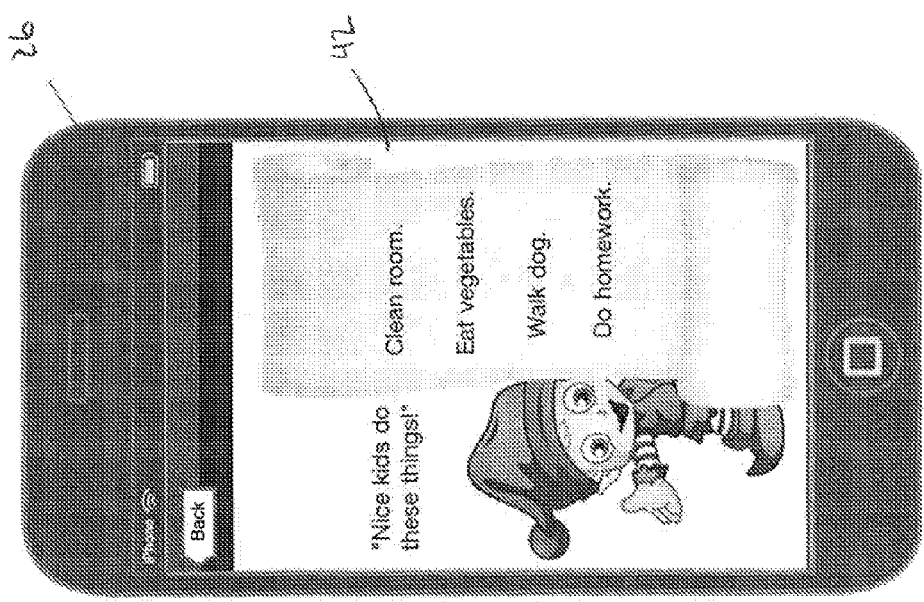
Figure 14:
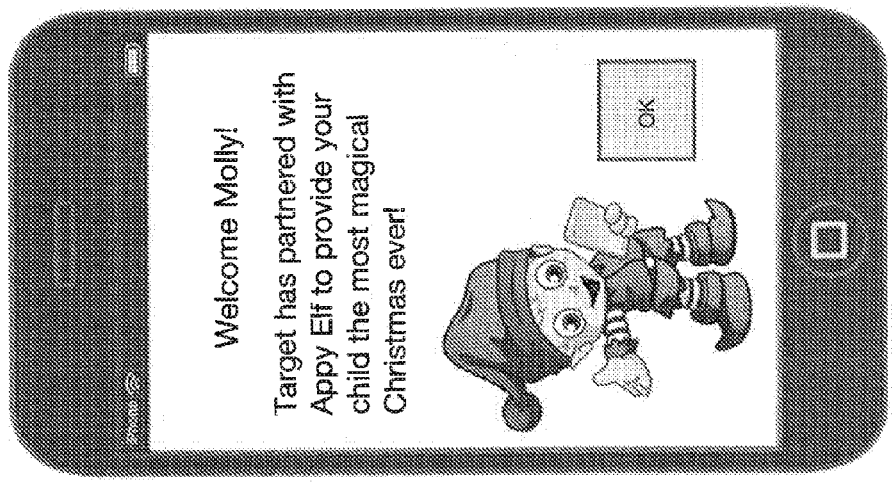
Figure 15:
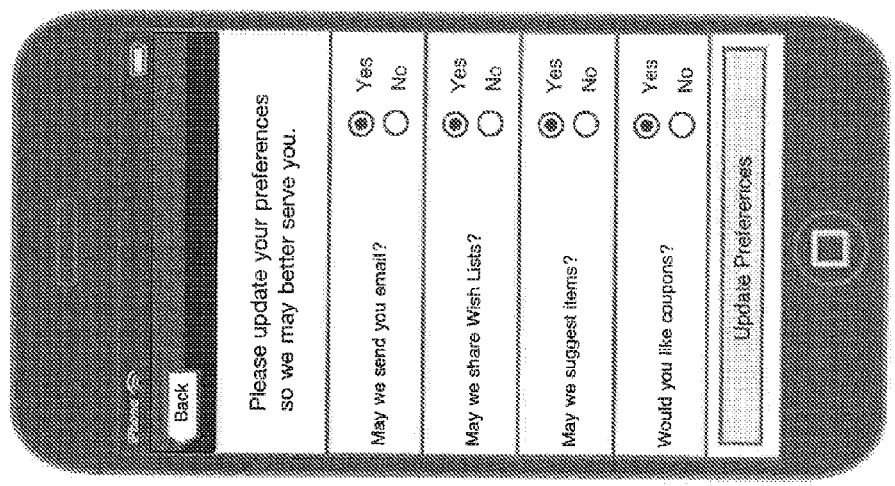

3. Each time a user begins use of the app with the Home Page 100, whether it be the child version of the app 14 or the parent version of the app 12, they will be asked to log-in. For example, and with reference to FIG. 4, the parent 18 is asked to log-in into the system or establish an account. In the event the parent 18 has not already established an account, the parent 18 is provided with opportunity to input personal information used in establishing an account (see FIGS. 5 and 6). It is appreciated that it is also possible to enable auto-log-in options to save the parent and/or child time when using the system.
4. The parent 18 is then asked to provide information specific to their children), including, but not limited to, age, name, gender, siblings, etc.) (see FIG. 7). It is appreciated the same app 12 can be used to track multiple children without the need for additional downloads. This information is uploaded and stored in the previously established user account 52 maintained on the database 54 of the system server 28 (or the local memory of the computer device) (see, for example, FIGS. 14 and 15 where tabs 110 are provided for different children in conjunction with a parent graphical user interface 40.
5. The parent 18 (or child/children if the parent should so decide) is then provided with the opportunity to further customize the fictitious character information (for example, boy vs. girl character, name, ethnicity, etc.) (see FIG. 8). The parent 18 can specify that there is one character per family or that each child can customize a character to his or her specific desires. This information is uploaded and stored in the previously established user account 52 on the database 54 of the system server 28 (or maintained on the local memory of the computer device). In addition to specifying the fictitious character information discussed above, the parent 18 is provided with the opportunity to customize the specific look of the fictitious character 16, for example, the elf by taking a picture and integrating the picture into the elf used in conjunction with the present system 10 (see FIGS. 9 and 10). In accordance with such functionality, the app 12 has a camera or photo editor feature built-in or as linked technology from either the hardware maker (such as Apple) or a photo company (such as Instagram). The photo customization provides entertainment and increased satisfaction with the app.
6. The parent can choose the fictitious character to match his or her preference and time of year. Various fictitious characters and costumes could be selected (Santa, Elf, Easter Bunny, Tooth Fairy, Leprechaun, various cartoon characters, superheroes, etc). It is also expected that this app could employ commonly know fictional characters such as Snow White or Nemo. In this way, studio and TV/film production companies could expand their reach in a one-on-one and personalized way.
7. Each app download is charged to a pre-established account with the system server, for example, the iTunes store or other mobile app store account.
8. If two distinct versions of the app exist, the child version of the app (residing on the child's computer device used by the child) logs into the user account of the parent, marrying the accounts (sub user account).
9. With the user account 52 fully established, the child 20 then opens the child version of the app 14 on the child computer device 26 (entering through the Home Page 100 shown in FIG. 3), logs-in, presses the wish list icon 102 and proceeds to customize his or her wish list with items he or she wants for being good (e.g. Christmas gifts). For example, and with reference to FIGS. 11, 12, and 13, the child 20 is provided with various toy options from which he or she may browse toys (see FIG. 11), add toys to a wish list (see FIG. 12) and view of list of selected toys (see FIG. 13). Parent(s) can see the wish list for each child.
10. When the child presses the "Send Wish List to Apply Elf" button 112 (as shown in FIG. 13), a character confirmation message sends a copy to the parent 18 and one from a system "fictitious third-party character" of receipt of the wish list. As previously discussed, the app may act in a preapproved yet seemingly autonomous way. For example, Santa may send the child a note saying that his or her wish list was received at the North Pole and was being reviewed by his elves.
11. In addition, and with reference to FIG. 14, the parent 18 creates, on the parent computer device 24, a daily check, in push message (reminder) where the parent selects a nice/happy or naughty/sad character button, (see FIG. 14). Various other forms of feedback, including animations, videos or songs may also be employed to express this message. The parent version of the app 12 is provided with an option for the creation of a pre-formatted list of "naughty" and "nice" items for each child and able to input short message relating to the selection (see FIG. 15). For example:
Naughty
  Talking back to parents
  Not finishing homework
  Not completing chores
  Fighting with siblings
  Not going to bed on time
  Getting in trouble at school
Nice
  Playing well with siblings
  Having a good day at school
  Helping around the house/completing chores
  Following routine, brushing teeth, getting self ready for school
  Following parental directions
10. Appropriate reminders are sent to the child computer device at time zone sensitive time of the message input by the parent prior to that time (e.g. 7 AM) (see FIGS. 16 and 17).
11. A status counter with a rule regarding the number of naughty marks turn the indicator negative or positive based on parent input as supplied via the graphical user interface shown in FIG. 14 and discussed above. It may default to positive and work on a star or other counter rating system.
12. Additional interactions such as videos, animations, songs, games and other features could be enabled or unlocked by the parent through the use of preapproved criteria.
13. Interaction options between parent version of the app 12 and retailers and other partners are also possible using the screens shown in FIGS. 18 and 19).
14. Updated versions based on user data and feedback.

The benefits to this proposed system are enormous. It provides parents with a modern tool to encourage good behavior in their children. It also gives children a fantastical platform to see their progress and list their wishes. It gives consumer goods companies and retailers an opportunity to gather invaluable data and interact with parents to ensure satisfied purchase decisions. As such, the consumer goods companies or retailers may combine the rewards data from various children in a geographic area to make purchase and sales decisions. It further provides the parent with the ability to cus-

The invention claimed is:

1. A system for behavior modification and sales promotion, comprising:
   a child computer device having a computer application stored thereon in a non-transitory computer readable memory, the computer application includes a graphical user interface allowing a child to interact with a fictitious character or toy;
   a parent computer device having the computer application stored thereon in a non-transitory computer readable memory, the computer application including a graphical user interface allowing a parent to control the fictitious character with which the child interacts on the child computer device such that the parent, speaking through the fictitious character, offers positive or negative feedback to the child,
   wherein said fictitious character comprises a first level of interface and a second level of interface to interact with the child;
   said first level of interface involves specific text and actions that the parent enters via the graphical user interface of the parent computer device in real-time, and
   said second level of interface involves an "autonomous" behavior that enables the fictitious character to respond automatically, wherein said computer application learns what the parent has entered overtime, via automated analysis of keystrokes and input, to generate said "autonomous" behavior;
   a system server; and
   a database of a consumer goods company or retailer;
   wherein the parent computer device, the child computer device, the database of the consumer goods company or retailer, and the system server are being connected by a global communication network, such that one or more data gathered from the use of the computer application in the parent computer device is used by the consumer goods company or retailer in making decisions about products offered to ensure timely delivery and effective pricing or divine patterns and trends helpful to product planning, purchasing, marketing and sales.

2. The system according to claim 1, wherein the parent computer device includes a parent version of the computer application.

3. The system according to claim 2, wherein the parent version of the computer application provides a graphical user interface allowing the parent to see everything the child has done.

4. The system according to claim 1, wherein the child computer device includes a child version of the computer application.

5. The system according to claim 4, wherein the child version of the computer application provides a game-like interface designed to keep the attention of the child.

6. The system according to claim 4, wherein the graphical user interface provides the child with an indication of a score.

7. The system according to claim 1, wherein the computer application includes a parent version of the computer application for the parent computer device, and a child version of the computer application for the child computer device.

8. The system according to claim 1, wherein the graphical user interface provides the child with an indication of a score.

9. The system according to claim 1, wherein the parent computer device includes a parent version of the computer application, said parent version of the computer application provides a graphical user interface allowing the parent to see everything the child has done.

10. The system according to claim 1, wherein the parent computer device is a desktop computer, laptop computer, smartphone, tablet or portable music/video player; and the child computer device is a desktop computer, laptop computer, smartphone, tablet or portable music/video player.

11. A method for behavior modification and sales promotion, comprising:
    installing a computer application on a non-transitory computer readable memory of a child computer device, the computer application includes a graphical user interface allowing a child to interact with a fictitious character;
    installing the computer application on a non-transitory computer readable memory of a parent computer device, the computer application including a graphical user interface allowing a parent to control the fictitious character with which the child interacts on the child computer device, such that the parent, speaking through the fictitious character, offers positive or negative feedback to the child,
    wherein said fictitious character comprises a first level of interface and a second level of interface to interact with the child;
    said first level of interface involves specific text and actions that the parent enters via the graphical user interface of the parent computer device in real-time, and
    said second level of interface involves an "autonomous" behavior that enables the fictitious character to respond automatically, wherein said computer application learns what the parent has entered overtime, via automated analysis of keystrokes and input, to generate said "autonomous" behavior;
    connecting the parent computer device, the child computer device and a database of a consumer goods company or retailer to a system server via a global communication network; and
    sending one or more data gathered from the use of the computer application in the parent computer device to the consumer goods company or retailer such that the data is used by consumer goods company or retailer in making decisions about products offered to ensure timely delivery and effective pricing or divine patterns and trends helpful to product planning, purchasing, marketing and sales.

12. The method according to claim 11, wherein the parent computer device is a desktop computer, laptop computer, smartphone, tablet or portable music/video player; and the child computer device is a desktop computer, laptop computer, tablet or portable music/video player.

13. The method according to claim 11, wherein the step of installing includes downloading the computer application to the parent computing device from the system server.

14. The method according to claim 11, wherein the step of installing includes downloading the computer application to the child computing device from the system server.

15. The method according to claim 11, wherein the computer application of the parent computing device gives the parent the option to encourage good behavior with rewards and discourage bad behavior with reminders, the removal of rewards or punishments.

16. The method according to claim 11, further including the step of allowing the child to select rewards based upon good behavior.

17. The method according to claim 11, whereby the consumer goods company or retailer receives data from the computer application for compilation and analysis.

18. The method according to claim 11, wherein the consumer goods company or retailer offers promotions to the parent or child for desired goods, products or services.

* * * * *